(12) United States Patent
Gerdemann et al.

(10) Patent No.: US 9,553,446 B2
(45) Date of Patent: Jan. 24, 2017

(54) SHARED ESD CIRCUITRY

(71) Applicant: FREESCALE SEMICONDUCTOR, INC., Austin, TX (US)

(72) Inventors: Alex P. Gerdemann, Austin, TX (US); Melanie Etherton, Austin, TX (US); James W. Miller, Austin, TX (US); Mohamed S. Moosa, Austin, TX (US); Robert S. Ruth, Austin, TX (US); Michael A. Stockinger, Austin, TX (US)

(73) Assignee: NXP USA, INC., Austin, TX (US)

( * ) Notice: Subject to any disclaimer, the term of this patent is extended or adjusted under 35 U.S.C. 154(b) by 233 days.

(21) Appl. No.: 14/529,282

(22) Filed: Oct. 31, 2014

(65) Prior Publication Data

US 2016/0126729 A1 May 5, 2016

(51) Int. Cl.
*H02H 9/00* (2006.01)
*H02H 9/04* (2006.01)

(52) U.S. Cl.
CPC ................................. *H02H 9/046* (2013.01)

(58) Field of Classification Search
USPC ........................................................ 361/56
See application file for complete search history.

(56) References Cited

U.S. PATENT DOCUMENTS

| 5,508,649 | A | 4/1996 | Shay |
| 5,654,862 | A | 8/1997 | Worley et al. |
| 6,385,021 | B1 | 5/2002 | Takeda et al. |
| 6,724,603 | B2 | 4/2004 | Miller et al. |
| 6,970,336 | B2 | 11/2005 | Stockinger et al. |
| 7,446,990 | B2 | 11/2008 | Miller et al. |
| 7,593,202 | B2 | 9/2009 | Khazhinsky et al. |
| 9,450,402 | B1* | 9/2016 | Huang .................. H02H 9/041 |
| 2001/0024348 | A1* | 9/2001 | May .................... H01L 27/0255 361/56 |
| 2006/0181823 | A1* | 8/2006 | Miller ................ H01L 27/0292 361/56 |
| 2009/0067104 | A1* | 3/2009 | Stockinger .......... H01L 27/0292 361/56 |
| 2015/0055259 | A1* | 2/2015 | Cao ........................ H02H 9/049 361/56 |
| 2015/0349522 | A1* | 12/2015 | Miller ................... H05K 9/006 361/56 |
| 2016/0126729 | A1* | 5/2016 | Gerdemann ........... H02H 9/046 361/56 |

OTHER PUBLICATIONS

U.S. Appl. No. 13/875,618, Etherton, M., et al., "Electrostatic Discharge (ESD) Clamp Circuit With High Effective Holding Voltage", filed on May 2, 2013.

* cited by examiner

*Primary Examiner* — Ronald W Leja

(57) ABSTRACT

An integrated circuit including ESD circuitry that is shared among more than one terminal segment of the integrated circuit to discharge current from an ESD event on any of the terminal segments. The shared ESD circuitry includes a clamp circuit that is coupled to power buses of each segment to discharge current from ESD events on each segment. The shared ESD circuitry includes a trigger circuit that is coupled to nodes coupled to terminals of each segment to detect an ESD event on each segment.

20 Claims, 4 Drawing Sheets

SHARED ESD CIRCUITRY

BACKGROUND OF THE INVENTION

Field of the Invention

This invention relates in general to electrostatic discharge protection circuitry for integrated circuits.

Description of the Related Art

Integrated circuits are sensitive to Electrostatic Discharge (ESD) events. An ESD event may occur from the unwanted quick discharge of a charged object or person and produce a high charge current for a short period of time through structures of the integrated circuit. For example, a person carrying a relatively small amount of charge may inadvertently touch the electrical terminals of the integrated circuit where charge from the person is transferred to the integrated circuit. In some instances, the amount of current from an ESD event is high enough to damage the circuitry of the integrated circuit.

To protect against ESD events, an integrated circuit may include ESD circuitry that allows for the relatively safe discharge of current from an ESD event to system ground. For examples, an integrated circuit may include trigger circuits that detect an ESD event at a terminal and camp circuits that, when activated by the trigger circuits, become conductive to provide a path for the current to flow from the terminal to ground.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

As disclosed herein, an integrated circuit includes ESD circuitry that is shared between different terminal segments of the integrated circuit. The shared ESD circuitry includes a clamp circuit that can discharge current from ESD events occurring at terminals of the segments. In some embodiments, a trigger circuit of the shared ESD circuitry includes multiple inputs with each input coupled to detect ESD events at terminals of one of the segments. In one embodiment, the trigger circuit is coupled to a boost bus of a segment to detect an ESD event at terminals of the segment. In some embodiments, utilizing shared ESD circuitry in an integrated circuit may allow for a reduction in the amount of space occupied by the ESD circuitry of the integrated circuit.

Figure 1:
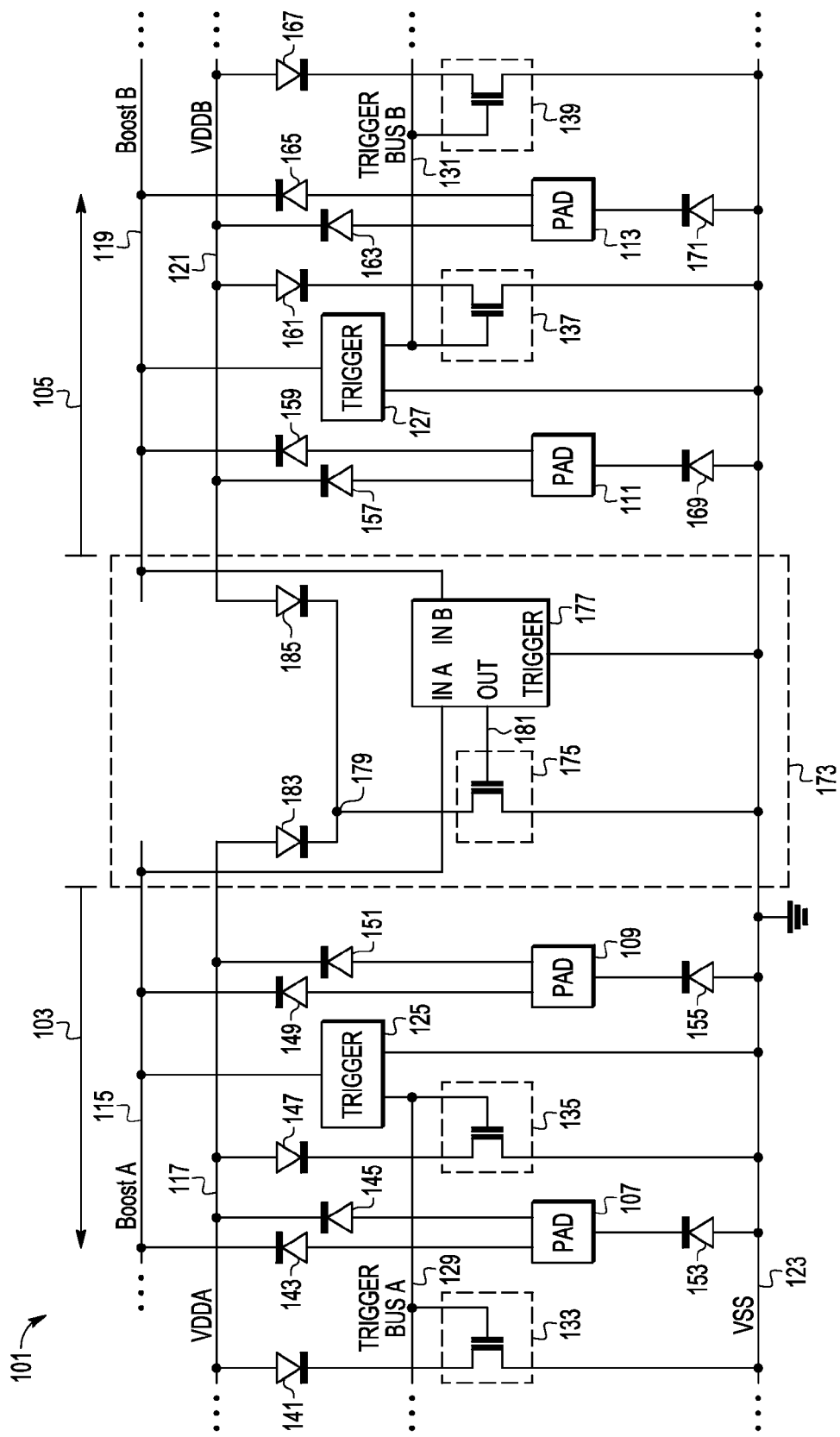
FIG. 1 is a circuit diagram of ESD circuitry of an integrated circuit according to one embodiment of the present invention.

FIG. 1 is a circuit diagram of ESD circuitry 101 of an integrated circuit according to one embodiment of the present invention. The embodiment shown in FIG. 1 includes ESD circuitry 101 for two terminal power domain segments 103 and 105. Segment 103 includes I/O pads (107, 109) that are coupled through diodes (145, 151) to a power bus (VDDA 117). Segment 105 includes I/O pads (111, 113) that are coupled through diodes (159, 165) to power bus 121 (VDDB). In some embodiments, terminal segments 103 and 105 are each located in a different power domain. In some embodiments, the power supply buses 117 and 121 are designed to receive different supply voltages (e.g. 5 V, 3.3 V) at least during some modes of operation of the integrated circuit. Each I/O pad (107, 109, 111, and 113) is coupled to the VSS system ground bus 123 through a diode (153, 155, 169, and 171) respectively. In some embodiments, the terminal segments (103, 105) may include power pads. In some embodiments, the pads are located at the periphery of the integrated circuit. Not shown in FIG. 1 are the logic circuitry (e.g. buffers, drivers, and level shifters) that are coupled to each of the pads for handling the signals being transferred via the pad. Although FIG. 1 shows two pads per segment, a segment may include more than two pads in other embodiments. Although pads are shown in FIG. 1, segments of other embodiments may include other types of terminals (e.g. bumps, posts) for conveying signals externally for the integrated circuit.

Circuitry 101 includes trigger circuits (125, 127) that sense an ESD event, and in response, assert a voltage on an ESD bus (129, 131) connected to its output. In one embodiment, a trigger circuit is designed to assert a signal when the speed of a rising edge of a voltage at a node exceeds a particular threshold. The threshold is typically faster than the speed of a rising edge that would be encountered during normal operation. However, other types of trigger circuits may be used in other embodiments. Although only one trigger circuit is shown per segment in FIG. 1, a segment may include multiple trigger circuits connected in parallel and physically located within the segment.

In the embodiment shown, each terminal segment (103, 105) includes an associated "boost" bus (115, 119). A boost bus is a bus that couples the pads of a segment to the trigger circuits of the segment. In one embodiment, the pads (107, 109, 111, and 113) are coupled to the boost busses of their segments through diodes (143, 149, 159, and 165).

Circuitry 101 includes clamp circuits (133, 135, 137, and 139) that, when made conductive, couple the voltage bus (117, 121) to the VSS bus 123 to discharge current from an ESD event. In the embodiment shown, the clamp circuits are implemented as NMOS transistors. However, clamp circuits may be implemented with other types of devices such as bipolar transistors, PMOS transistors, or silicon controlled rectifiers in other embodiments. In the embodiment shown, each clamp circuit is coupled to the power bus (117, 121) via a diode (141, 147 161, 167) with the cathode of the diode connected to the clamp circuit and the anode of the diode connected to the power bus (VDDA, VDDB).

During an ESD event on a pad of a segment, the voltage of the boost bus changes at a rate greater than a particular threshold. In response, the trigger circuits of the segment assert a voltage on the trigger bus (129, 131) that makes the clamp circuits conductive to shunt the current of the ESD event from the pad to the VSS bus, thereby preventing damage to the logic circuitry (not shown) of the integrated circuit. For example, if a person were to touch pad 107, current discharging from the person to pad 107 would cause the voltage of boost bus 115 to increase with a rate greater than the triggering threshold of trigger circuit 125. In response, trigger circuit 125 asserts a voltage on trigger bus 129 to make conductive clamp circuits 133 and 135 to discharge the ESD current through power supply bus VDDA and diodes 141 and 147 to VSS bus 123.

In the embodiment shown, boost buses 115, 119 are not coupled to the clamp circuits 133, 135, 137 and 139. Thus, during an ESD event on a segment, the majority of the current of the ESD event flows through the power bus of the segment with a minimal amount of current flowing through the boost bus of the segment. Accordingly, the voltage of the boost bus remains higher than the voltage of the power supply bus during an ESD event. Thus, during an ESD event, the voltage supplied to a trigger circuit (125, 127) is higher than the voltage on the power supply bus (117, 121). As a result, an asserted voltage on a trigger bus (129, 131) is higher than the voltage of the drain of the NMOS transistor of the clamp circuit (133, 135, 137, and 139). In such a condition, the NMOS transistor is overdriven ($V_{gs} \gg V_{ds}$) which results in an increase in the conductance of the clamp circuit. Hence, with the implementation of a boost bus, the size of a clamp circuit may be reduced as opposed to ESD circuitry that does not utilize a boost bus (See FIG. 4).

FIG. 1 only shows two clamp circuits per segment. However, in other embodiments, multiple clamp circuits would be distributed throughout the segment, with each clamp circuit having a control terminal coupled to the trigger bus (129, 131) of the segment. Thus, during the detection of an ESD event, every clamp circuit of the segment is made conductive to shunt ESD current from a power bus (117, 121) to VSS bus 123. The amount of current shunted by a particular clamp circuit during an ESD event is dependent upon the location of the clamp circuit with respect to the pad of the ESD event. Because the power busses (117, 121) have a resistance, the amount of current discharged by the clamp circuits located closer to the pad is greater than the amount of current discharged by clamp circuits located farther away from the pad.

In order to effectively and efficiently discharge ESD current, in some embodiments, it is desirable to evenly space the location of the clamp circuits within a segment. If there is an ESD event at a particular pad, current will be discharged through clamp circuits located on both sides of the pad along the bus.

However, if the ESD event occurs at a pad physically located at the end of a segment, the amount of current that can be discharged by the clamp circuits is reduced due to fact that there are clamp circuits only on one side of the pad. To overcome this problem, prior ESD circuitry have included a larger clamp circuit at the end of a segment (referred to as a terminating clamp circuit). In some embodiments, the terminating clamp circuit may be at least twice as large (e.g. six times larger) as an interior clamp circuit of the segment. Accordingly, terminating clamp circuits can take up a lot of integrated circuit space. In some examples, the number of terminating clamp circuits on an integrated circuit may be at least two times the number of terminal segments on the integrated circuit.

ESD circuitry 101 includes a shared termination system that allows for a clamp circuit to be shared between two segments. Shared termination system 173 includes a clamp circuit 175 that is made conductive by trigger circuit 177. In the embodiment shown, trigger circuit 177 includes two inputs (INA and INB) with each input coupled to a boost bus (115, 119) of a segment (103, 105) for detecting an ESD event on either segment (103, 105). Diodes 183 and 185 are coupled between the power supply busses (117 and 121, respectively) and allow for different voltages to reside on the power supply busses 117 and 121 during normal operation as well as to provide noise isolation between the busses. In one embodiment, clamp circuit 175 is a larger (e.g. 6 times larger) than interior clamp circuits (e.g. 133, 135, 137, and 139) in that it serves as a terminating clamp circuit for both segments (103 and 105).

In response to an ESD event detected on either bus 115 for segment 103 or bus 119 for segment 105, trigger circuit 177 makes conductive clamp circuit 175 to discharge ESD current from power supply bus 117 or power supply bus 121 during the ESD event. For example, an ESD event detected on boost bus 115 will cause trigger circuit 177 to make clamp circuit 175 conductive to discharge current from a pad of segment 103 through bus 117, diode 183, node 179, and clamp circuit 175 to the VSS bus 123. An ESD event detected on boost bus 119 will cause trigger circuit 177 to make clamp circuit 175 conductive to discharge current from a pad of segment 105 through bus 121, diode 185, node 179, and clamp circuit 175 to the VSS bus 123.

Providing a shared termination system allows for, in some embodiments, the use of large terminating clamp circuits to discharge ESD current for multiple bus segments. Accordingly, in some embodiments, the number of terminating clamp circuits, and therefore the amount of space occupied by terminating clamp circuits on an integrated circuit can be reduced.

In the embodiment, shown, clamp circuit 175 includes only one NMOS transistor. However, in other embodiments, other types of devices may be used as clamp circuits such as PMOS transistors, bipolar transistors, and silicon controlled rectifiers. In other embodiments, a clamp circuit may include multiple devices (e.g. multiple transistors) coupled in parallel and controlled by trigger circuit 177 to shunt current from either power bus of a segment. The multiple transistors may be located physically together on the die or may be interspersed in the segments.

Figure 2:
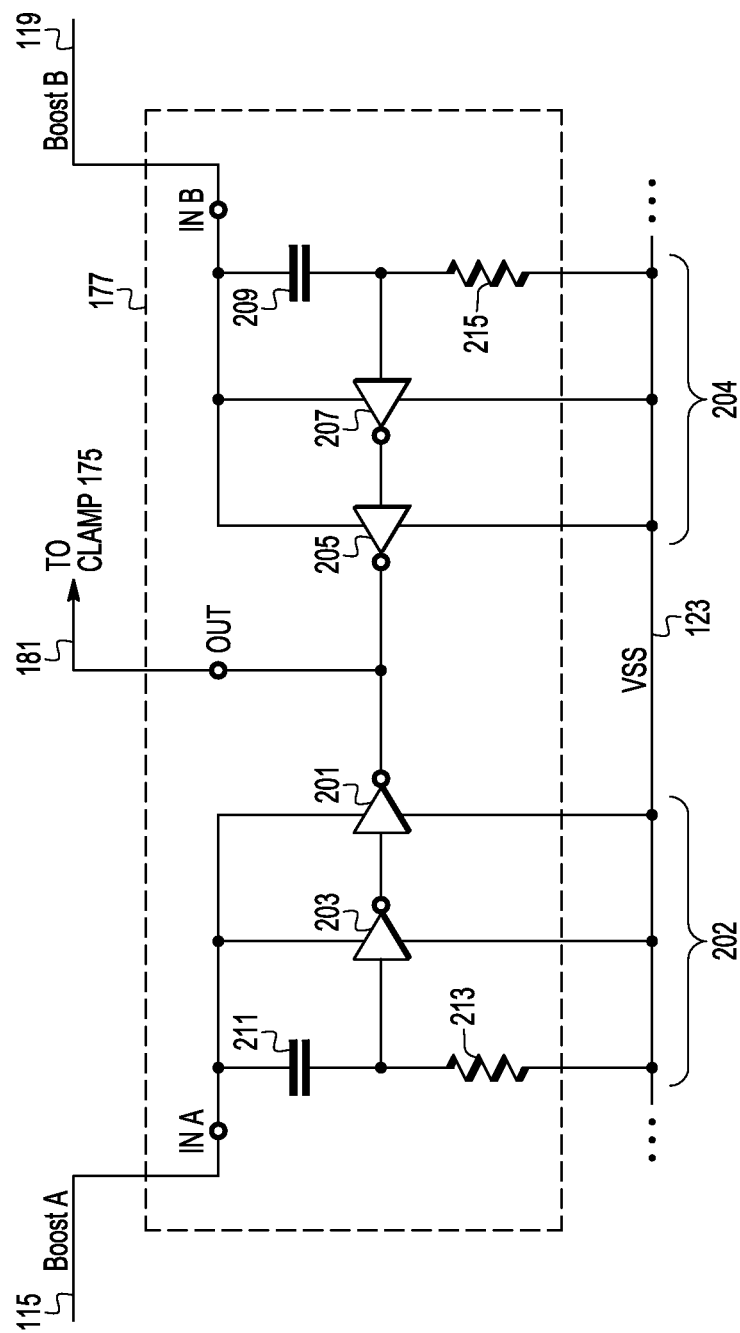
FIG. 2 is a circuit diagram of a trigger circuit according to one embodiment of the present invention.

FIG. 2 is a circuit diagram of trigger circuit 177 according to one embodiment of the present invention. Circuit 177 includes one input (INA) connected to boost bus 115 and a second input (INB) connected to boost bus 119. Circuit 115 includes a first circuit portion 202 that determines whether an ESD event is occurring on segment 103 and a second circuit portion 204 that determines whether an ESD event is occurring on segment 105. The detection of an ESD event by either portion (202, 204) causes the output (OUT) of circuit 177 to go high which makes clamp circuit 175 conductive.

Portion 202 includes a capacitor 211, resistor 213, inverter 203, and inverter 201. Portion 204 includes a capacitor 209, resistor 215, inverter 207, and inverter 205. The resistors and capacitors form an R-C circuit for each portion. In one embodiment, capacitors 211 and 209 are implanted as MOS capacitors, and resistors 213 and 215 are implemented as long channel MOSFET devices with their control terminals tied to a bias circuit or the corresponding boost bus.

The transient event detection threshold at which each portion (202 and 204) will indicate an ESD event is based the capacitance and resistance of the portion. If the change in voltage of the boost bus is faster than the event detection threshold, the output of the first inverter (203, 207) of that portion (202, 204) will be pulled low which causes the output of the second inverter (201, 205) to be pulled high to make clamp circuit 175 conductive.

During an ESD event, each trigger circuit portion (202, 204) receives power for operation from the boost bus (115, 119) coupled to its input (INA, INB). For example, during an ESD event on segment 103, invertors 203 and 201 receive power for operation from boost bus 115.

In one embodiment, the pull up devices (e.g. PMOS transistors in some embodiments) of invertors 201 and 205 are sized to be stronger than the corresponding pull down devices (e.g. NMOS transistors in some embodiments) in order to avoid potential logic contention issues on node 181. In other examples, inverters 201 and 205 may include a PMOS transistor for the pull up device and a resistor for a pull down device. In some embodiments, the outputs of the two portions are configured in a wired OR configuration. However, other trigger circuits may have other configurations in other embodiments.

Figure 3:
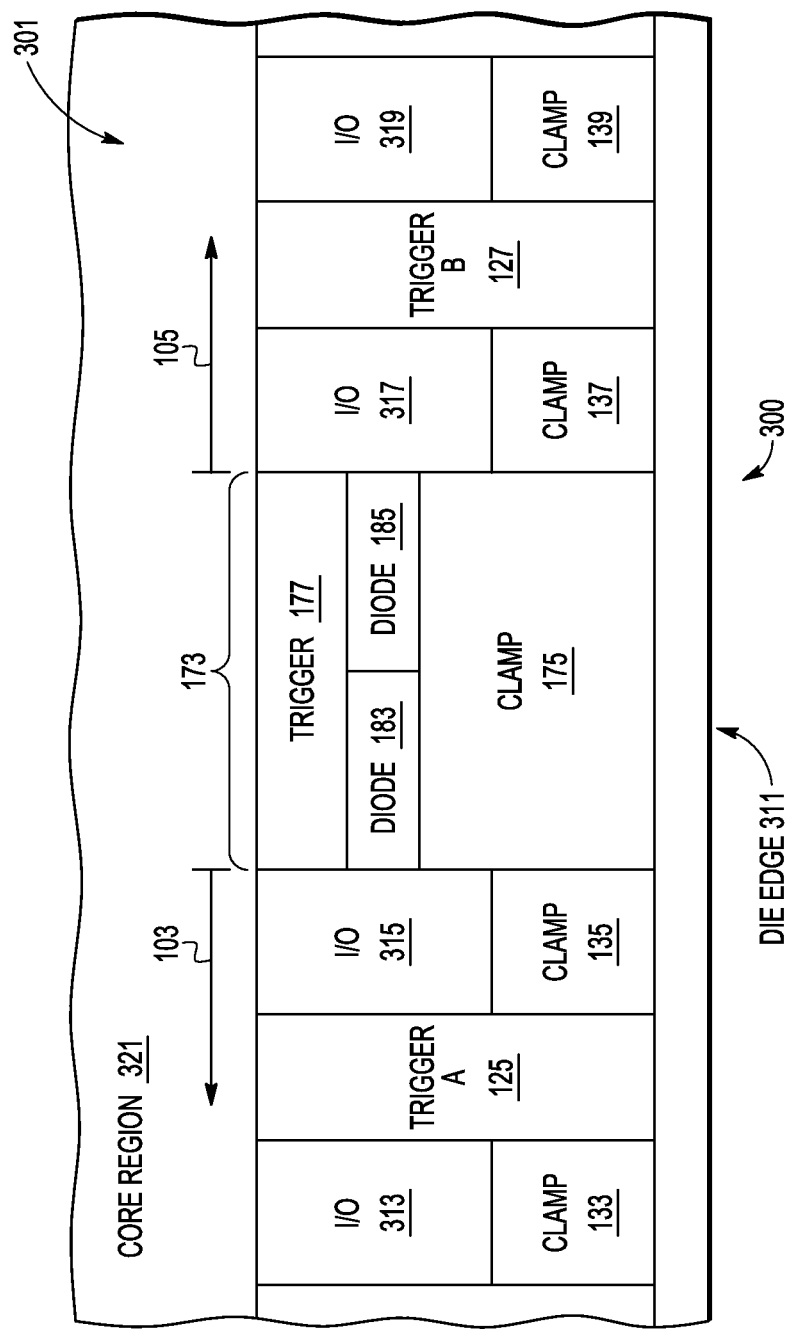
FIG. 3 is plan view of a portion of an integrated circuit according to one embodiment of the present invention.

FIG. 3 is a plan view of a portion of an integrated circuit 300 according to one embodiment of the present invention. FIG. 3 shows the "floor plan" of the circuitry of a portion of a terminal ring 301 of integrated circuit 300. Shared termination system 173 is located in ring 301 between segment 103 and segment 105. In the embodiment shown, ring 301 is located in proximity to the edge 311 of integrated circuit 300 (also referred to as a die edge). The core region 321 of integrated circuit 300 is located interior from ring 301. The core region may include logic, memory, processing, sensing, and/or other types of circuitry of integrated circuit 300 coupled to the terminals of ring 301. In some embodiments, the circuitry is implemented with transistors formed in the semiconductor material of the substrate of the integrated circuit. In other embodiments, terminal segments may be located in other parts of the integrated or configured in different orientations. Not shown in FIG. 3 are the interconnecting structures (e.g. power buses, signal buses, and interconnects) located over the semiconductor material that interconnect the devices of integrated circuit 300.

In FIG. 3, I/O block 313 includes pad 107 and diodes 143, 145, and 153. I/O block 315 includes pad 109 and diodes 149, 151, and 155. I/O block 317 includes pad 111 and diodes 157, 159, and 169. I/O block 319 includes pad 113 and diodes 163, 165, and 171. The I/O blocks also include logic circuitry associated with each pad that was not shown in FIG. 1. It is understood that the term "I/O" in I/O block or I/O pad can refer to a device that is input only, output only, or can serve as both input and output. In the embodiment shown, the blocks for clamp circuits 133, 135, 137, and 139 include a corresponding diode (e.g. 141, 147, 161, and 167, respectively). The floor plan of the ESD circuitry may be laid out differently in other embodiments.

As shown in FIG. 3, clamp circuit 175 is a larger clamp circuit than the other clamp circuits (133, 135, 137, and 139) shown in FIG. 3 and therefore occupies a greater area of the floor plan of integrated circuit 300. Accordingly, having a clamp circuit (e.g. 175) that is shared between two segments allows for the ESD circuitry to take up less of the floor plan of an integrated circuit.

Figure 4:
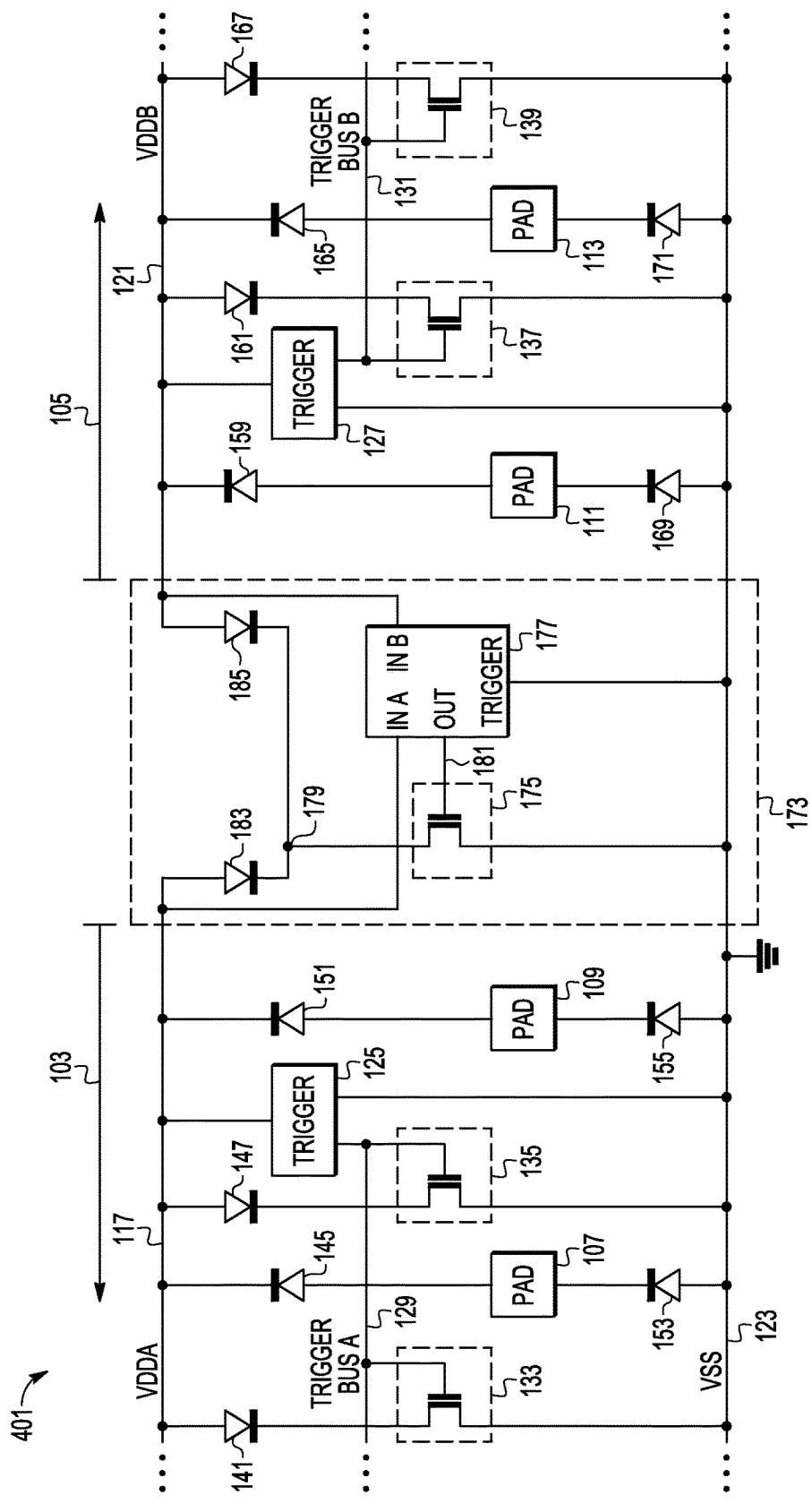
FIG. 4 is a circuit diagram of ESD circuitry of an integrated circuit according to another embodiment of the present invention.

FIG. 4 is a circuit diagram of ESD circuitry according to another embodiment of the present invention. The embodiment of FIG. 4 is similar to the embodiment of FIG. 1 except that ESD circuitry 401 does not include boost buses 115 and 119 and diodes 143, 149, 159, and 165. Else, the items of FIG. 4 are the same as those with the same number in FIG. 1.

Because there are no boost busses in the embodiment of FIG. 4, the trigger circuits 125, 177, and 127 sense ESD events from the power supply busses VDDA 117 and VDDB 121. One input (INA) of trigger circuit 177 is connected to power supply bus VDDA 117 and the other input (INB) is connected power supply bus VDDB 121.

In other embodiments, the shared clamp circuit may be shared by more than two segments. In one such modification of FIG. 1, additional power busses would each be coupled via a diode (similar to diodes 183 and 185) to node 179. Also, in one modification, trigger circuit 177 (see FIG. 2) would include an additional portion (similar to portions 202 and 204) for each additional segment using the shared ESD clamp circuit 175. However, other embodiments may have other configurations.

In one embodiment, an integrated circuit includes an ESD clamp circuit, a first bus coupled to a first current electrode of the ESD clamp circuit, a first diode coupled between the first bus and the first current electrode, a second bus coupled to the first current electrode of the ESD clamp circuit, a second diode coupled between the second bus and the first current electrode, and a first plurality of terminals. Each terminal of the first plurality is coupled to the first bus. The integrated circuit includes a second plurality of terminals. Each terminal of the second plurality is coupled to the second bus. The integrated circuit includes a trigger circuit including a first input coupled to a first node to sense an ESD event occurring on at least one terminal of the first plurality of terminals, a second input coupled to a second node to sense an ESD event occurring on at least one terminal of the second plurality of terminals, and an output coupled to a control electrode of the ESD clamp circuit for making the ESD clamp circuit conductive in response to a sensed ESD event on at least one terminal of the first plurality of terminals to discharge current from the sensed ESD event on the first bus through the first diode and for making the ESD clamp circuit conductive in response to a sensed ESD event on at least one terminal of the second plurality of terminals to discharge current from the sensed ESD event on the second bus through the second diode.

In another embodiment, an integrated circuit includes a first bus, a second bus, and a first ESD clamp circuit coupled to the first bus for discharging current on the first bus from an ESD event. The first ESD clamp circuit is not coupled to the second bus to discharge current on the second bus from an ESD event. The integrated circuit includes a second ESD clamp circuit coupled to the second bus for discharging current on the second bus from an ESD event. The second ESD clamp circuit is not coupled to the first bus to discharge current on the first bus from an ESD event. The integrated circuit includes a third ESD clamp circuit coupled to the first bus for discharging current on the first bus from an ESD event and to the second bus for discharging current on the second bus from an ESD event.

In another embodiment, an integrated circuit includes a first segment comprising a first plurality of terminals. Each terminal of the first plurality is coupled to a first bus. The integrated circuit includes a first node and a second segment comprising a second plurality of terminals. Each terminal of the second plurality is coupled to a second bus. The integrated circuit also includes a second node and a first trigger circuit portion including an input and an output. The input of the first trigger circuit portion is coupled to the first node to sense an ESD event occurring in the first segment. The integrated circuit includes a second trigger circuit portion including an input and an output. The input of the second trigger circuit portion is coupled to the second node to sense an ESD event occurring in the second segment. The integrated circuit includes an ESD clamp circuit including a first current electrode and a control electrode. The control electrode is coupled to the output of the first trigger circuit portion and the output of the second trigger circuit portion for making the ESD clamp circuit conductive in response to a detected ESD event occurring on the first segment or occurring on the second segment to discharge current from the detected ESD event.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. An integrated circuit comprising:
   an ESD clamp circuit;
   a first bus coupled to a first current electrode of the ESD clamp circuit;
   a first diode coupled between the first bus and the first current electrode;
   a second bus coupled to the first current electrode of the ESD clamp circuit;
   a second diode coupled between the second bus and the first current electrode;
   a first plurality of terminals, each terminal of the first plurality coupled to the first bus;
   a second plurality of terminals, each terminal of the second plurality coupled to the second bus; and
   a trigger circuit including a first input coupled to a first node to sense an ESD event occurring on at least one terminal of the first plurality of terminals, a second input coupled to a second node to sense an ESD event occurring on at least one terminal of the second plurality of terminals, and an output coupled to a control electrode of the ESD clamp circuit for making the ESD clamp circuit conductive in response to a sensed ESD event on at least one terminal of the first plurality of terminals to discharge current from the sensed ESD event on the first bus through the first diode and for making the ESD clamp circuit conductive in response to a sensed ESD event on at least one terminal of the second plurality of terminals to discharge current from the sensed ESD event on the second bus through the second diode.

2. The integrated circuit of claim 1, wherein the first node is a node of the first bus and the second node is a node of the second bus.

3. The integrated circuit of claim 1, wherein:
   the first node is a node of a third bus that is a separate bus from the first bus, each terminal of the first plurality of terminals is coupled to the third bus; and
   the second node is a node of a fourth bus that is a separate bus from the second bus, each terminal of the second plurality of terminals is coupled to the fourth bus.

4. The integrated circuit of claim 1, further comprising:
   a first plurality of ESD clamp circuits coupled to the first bus for discharging current on the first bus from an ESD event, wherein the first plurality of ESD clamp circuits is not coupled to the second bus to discharge current on the second bus from an ESD event; and
   a second plurality of ESD clamp circuits coupled to the second bus for discharging current on the second bus from an ESD event, wherein the second plurality of ESD clamp circuits is not coupled to the first bus to discharge current on the first bus from an ESD event.

5. The integrated circuit of claim 4, further comprising:
   a second trigger circuit including a first input coupled to the first node and an output coupled to a control electrode of each of the first plurality of ESD clamp circuits;
   a third trigger circuit including a first input coupled to the second node and an output coupled to a control electrode of each of the second plurality of ESD clamp circuits.

6. The integrated circuit of claim 1, wherein the trigger circuit further includes:
   a first circuit portion, the first circuit portion including the first input and a first portion output coupled to the output of the trigger circuit, the first portion output for providing an indication of an ESD event occurring on at least one terminal of the first plurality of terminals;
   a second circuit portion, the second circuit portion including the second input and a second portion output coupled to the output of the trigger circuit, the second portion output for providing an indication of an ESD event occurring on at least one terminal of the second plurality of terminals.

7. The integrated circuit of claim 6, wherein the first portion output and the second portion output are coupled in a wired-OR configuration.

8. The integrated circuit of claim 6, wherein the first node supplies power to the first circuit portion when an ESD event is occurring on at least one terminal of the first plurality of terminals and the second node supplies power to the second circuit portion when an ESD event is occurring on at least one terminal of the second plurality of terminals.

9. The integrated circuit of claim 1, wherein the ESD clamp circuit is characterized as a termination clamp circuit for the first plurality of terminals and the second plurality of terminals.

10. The integrated circuit of claim 1, wherein the trigger circuit comprises a first R-C circuit coupled to the first input to detect an ESD event occurring on at least one terminal of the first plurality of terminals and comprises a second R-C circuit coupled to the second input to detect an ESD event occurring on at least one terminal of the second plurality of terminals.

11. The integrated circuit of claim 1, wherein the first plurality of terminals is located in a first region of the integrated circuit and the second plurality of terminals is located in a second region of the integrated circuit, wherein the ESD clamp circuit is located between the first region and the second region.

12. The integrated circuit of claim 11, wherein the first and second regions are located proximate to an edge of the integrated circuit.

13. An integrated circuit comprising:
   a first bus;
   a second bus;
   a first ESD clamp circuit coupled to the first bus for discharging current on the first bus from an ESD event, wherein the first ESD clamp circuit is not coupled to the second bus to discharge current on the second bus from an ESD event;
   a second ESD clamp circuit coupled to the second bus for discharging current on the second bus from an ESD event, wherein the second ESD clamp circuit is not coupled to the first bus to discharge current on the first bus from an ESD event; and
   a third ESD clamp circuit coupled to the first bus for discharging current on the first bus from an ESD event and to the second bus for discharging current on the second bus from an ESD event.

14. The integrated circuit of claim 13, further comprising:
a first trigger circuit including a first input coupled to a first node and an output coupled to a control electrode of the first ESD clamp circuit for making the first ESD clamp circuit conductive in response to a detected ESD event to discharge current on the first bus from the detected ESD event;
a second trigger circuit including a first input coupled to a second node and an output coupled to a control electrode of the second ESD clamp circuit for making the second ESD clamp circuit conductive in response to a detected ESD event to discharge current on the second bus from the detected ESD event; and
a third trigger circuit including a first input coupled to the first node and a second input coupled to the second node, and an output coupled to a control electrode of the third ESD clamp circuit for making the third ESD clamp circuit conductive in response to a detected ESD event to discharge current from at least one of a group comprising the first bus and the second bus from the detected ESD event.

15. The integrated circuit of claim 13 further comprising:
core circuitry;
a first plurality of I/O terminals coupled to the first bus and coupled to the core circuitry;
a second plurality of I/O terminals coupled to the second bus and coupled to the core circuitry.

16. The integrated circuit of claim 13, wherein the first bus is characterized as a power bus and the second bus is characterized as a power bus.

17. The integrated circuit of claim 13, wherein the third ESD clamp circuit is at least twice a size in area of each of the first ESD clamp circuit and the second ESD clamp circuit.

18. An integrated circuit comprising:
a first segment comprising a first plurality of terminals, each terminal of the first plurality coupled to a first bus;
a first node;
a second segment comprising a second plurality of terminals, each terminal of the second plurality coupled to a second bus;
a second node;
a first trigger circuit portion including an input and an output, the input of the first trigger circuit portion coupled to the first node to sense an ESD event occurring in the first segment;
a second trigger circuit portion including an input and an output, the input of the second trigger circuit portion coupled to the second node to sense an ESD event occurring in the second segment;
an ESD clamp circuit including a first current electrode and a control electrode, the control electrode coupled to the output of the first trigger circuit portion and the output of the second trigger circuit portion for making the ESD clamp circuit conductive in response to a detected ESD event occurring on the first segment or occurring on the second segment to discharge current from the detected ESD event.

19. The integrated circuit of claim 18, wherein the first node supplies power to the first trigger circuit portion when an ESD event is occurring on the first segment and the second node supplies power to the second trigger circuit portion when an ESD event is occurring on the second segment.

20. The integrated circuit of claim 18, further comprising a first diode coupled between the first bus and the first current electrode of the ESD clamp circuit and a second diode coupled between the second bus and the first current electrode.

* * * * *